(12) United States Patent
Kannepalli (10) Patent No.: US 10,749,839 B2
(45) Date of Patent: Aug. 18, 2020

(54) IDENTIFICATION OF A SIGNIFICANT COMMUNICATION FROM A REVIVED CONTACT

(71) Applicant: Microsoft Technology Licensing, LLC, Redmond, WA (US)

(72) Inventor: Venkat Sreekanth Kannepalli, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 127 days.

(21) Appl. No.: 15/492,056

(22) Filed: Apr. 20, 2017

(65) Prior Publication Data
US 2018/0309714 A1 Oct. 25, 2018

(51) Int. Cl.
*H04L 29/12* (2006.01)
*H04L 29/08* (2006.01)
*H04L 12/58* (2006.01)
*G06Q 10/10* (2012.01)

(52) U.S. Cl.
CPC ....... *H04L 61/1564* (2013.01); *G06Q 10/107* (2013.01); *H04L 51/16* (2013.01); *H04L 67/22* (2013.01)

(58) Field of Classification Search
CPC ..... H04L 61/1564; H04L 67/22; H04L 51/16; H04L 61/156; G06Q 10/107
See application file for complete search history.

(56) References Cited

U.S. PATENT DOCUMENTS

| 8,095,613 | B1 | 1/2012 | Perkowitz et al. |
| 8,312,096 | B2 | 11/2012 | Cohen et al. |
| 2004/0073643 | A1* | 4/2004 | Hayes ........... G06Q 10/107 709/223 |
| 2007/0179945 | A1* | 8/2007 | Marston ........ G06Q 10/107 |
| 2007/0198281 | A1* | 8/2007 | Abernethy, Jr. ..... G06Q 10/109 709/204 |
| 2008/0147639 | A1* | 6/2008 | Hartman ......... G06F 16/24578 |

(Continued)

FOREIGN PATENT DOCUMENTS

WO 2001069432 A2 9/2001

OTHER PUBLICATIONS

"International Search Report & Written Opinion Issued in PCT Application No. PCT/US2018/026369", dated Jun. 8, 2018, 13 Pages.

(Continued)

*Primary Examiner* — Chris Parry
*Assistant Examiner* — Kristoffer L S Sayoc
(74) *Attorney, Agent, or Firm* — Holzer Patel Drennan (57) ABSTRACT

A system identifies a significant communication from a revived contact. A user and the contact interact, and the interaction is monitored to determine a weighted significance value to attribute to the contact. The interaction may include communication, a designation of significance by the user, and organizational associations. The weighted significance value is attributed to the contact. A subsequent communication is detected and a weighted time difference value for the subsequent communication is determined. If the subsequent communication satisfies a significant communication condition, then the subsequent communication is designated as a significant communication.

26 Claims, 8 Drawing Sheets

(56) References Cited

U.S. PATENT DOCUMENTS

| | | |
|---|---|---|
| 2010/0077041 A1 | 3/2010 | Cowan et al. |
| 2011/0235575 A1 | 9/2011 | Tapia et al. |
| 2012/0054132 A1 | 3/2012 | Aberdeen et al. |
| 2012/0221638 A1 | 8/2012 | Edamadaka et al. |
| 2012/0245925 A1 | 9/2012 | Guha et al. |
| 2013/0086181 A1 | 4/2013 | Vitaldevara et al. |
| 2013/0212047 A1 | 8/2013 | Lai et al. |
| 2013/0288722 A1 | 10/2013 | Ramanujam et al. |
| 2014/0108562 A1 | 4/2014 | Panzer |
| 2016/0162601 A1* | 6/2016 | Wohlert ............... G06F 3/04817 707/748 |
| 2017/0236081 A1* | 8/2017 | Grady Smith ..... G06Q 10/0637 705/7.36 |

OTHER PUBLICATIONS

Yoo, et al., "Mining Social Networks for Personalized Email Prioritization", IIn Proceedings of the 15th ACM SIGKDD International Conference on Knowledge Discovery and Data Mining, Jun. 28, 2009, 9 pages.

\* cited by examiner

IDENTIFICATION OF A SIGNIFICANT COMMUNICATION FROM A REVIVED CONTACT

BACKGROUND

As a user utilizes a communication service, such as an email application, the communication service may learn to prioritize received messages. Such prioritization may account for popular contacts, recent contacts, etc. Circumstances may cause the user to stop communicating with a contact that was once a prioritized contact. Such circumstances may include the user changing jobs, moving to a new city, etc. Any subsequent message from the contact may not be prioritized, and as such, the user may miss an opportunity to reconnect with the contact.

SUMMARY

In at least one implementation, the described technology includes a system including a contact significance manager that attributes a weighted significance value to a contact. The weighted significance value is determined based on interaction between the contact and a user. The system includes a communication monitoring service configured to detect a subsequent communication received by the user from the contact. The system further includes a revived contact identifier configured to determine a weighted time difference value for the received subsequent communication. The weighted time difference value is based on a time interval between a time of the last communication between the contact and the user and a time of receipt of the subsequent communication by the user. The revived contact identifier is further configured to designate the received subsequent communication as a significant communication responsive determining that the subsequent communication satisfies a significant communication condition. Satisfaction of the significant communication condition is dependent on the weighted significance value and the weighted time difference value.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTIONS

One or more implementations described herein provide a method and system for identifying communications from a "revived" contact. For example, as a user uses a communication service, such as an email application, the communication service may learn to prioritize received messages. Such prioritization may account for popular contacts, recent contacts, etc. Circumstances may cause the user to stop communicating with a contact that was once a prioritized contact. Such circumstances may include the user changing jobs, moving to a new city, etc. Any subsequent message from the contact may not be prioritized, and as such, the user may miss an opportunity to reconnect with the contact. The implementations described herein designate a subsequent message as a significant message based on a number of factors. As such, if communication between the user and the contact subsides for an extended period, the subsequent message received after the extended period from the contact is designated as a significant message. Because the subsequent message is designated as a significant message, the user may be notified of the message from the "lost" contact such that the contact may be "revived" and the user and the contact may be reconnected.

Figure 1:
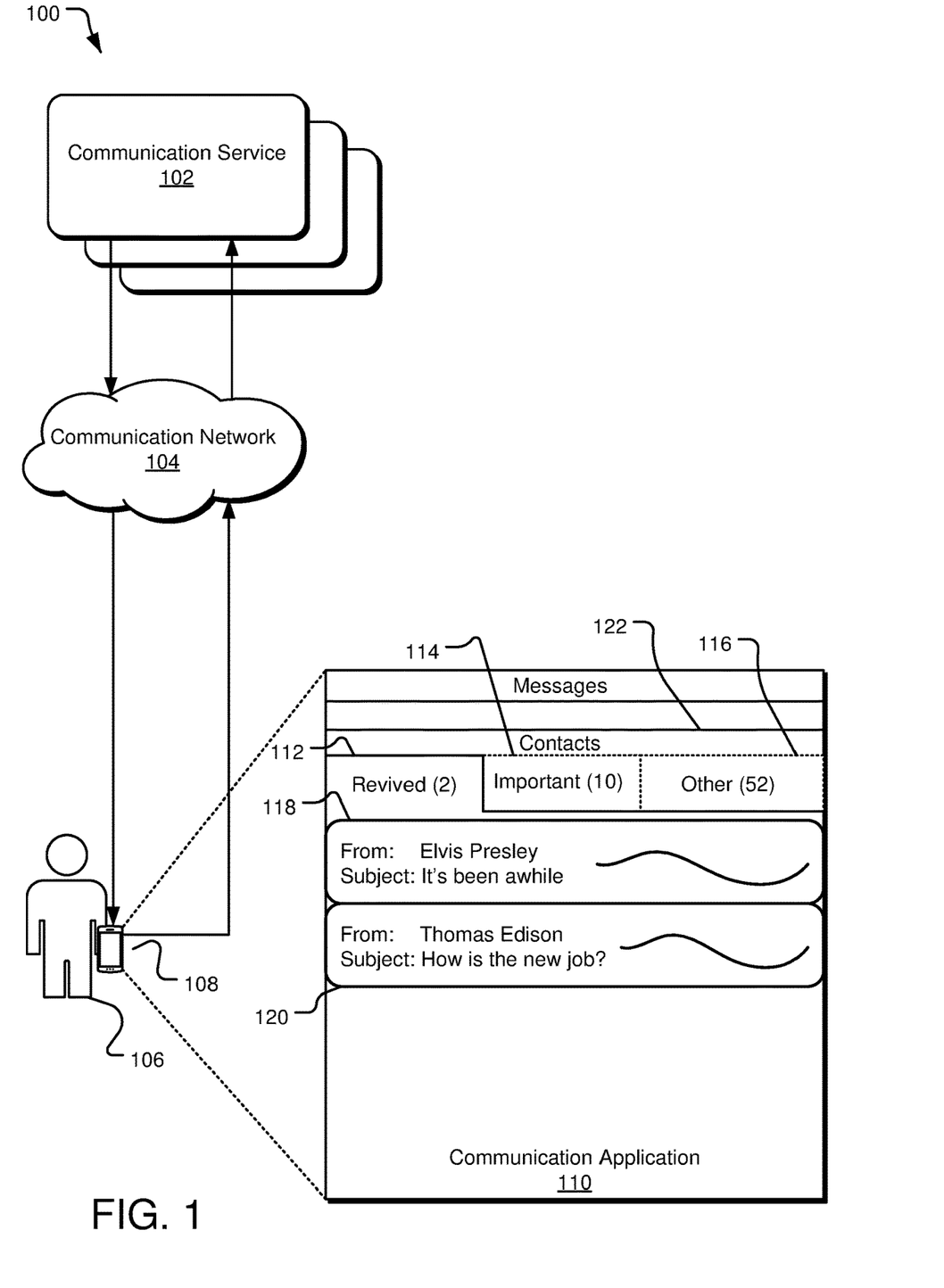
FIG. 1 illustrates an example block diagram for identifying a significant communication from a revived contact.

FIG. 1 illustrates an example block diagram 100 for identifying a significant communication from a revived contact. The block diagram 100 includes a communication service 102, a communication network 104, a user 106 with a computing device 108. The computing device 108 may be a smart phone, tablet, phablet, laptop, desktop computer, gaming device, etc. The computing device 108 is executing a communication application 110, which may be embodied in processor executable instruction and executed by a processor (not shown) of the computing device 108. The communication network 104 may include a number of elements for facilitating wired or wireless communication including 3G, 4G, long-term evolution (LTE), Wi-Fi, Near Field Communication (NFC), Bluetooth®, Global Positioning System (GPS), and other communication protocol elements. The communication service 102 may be a cloud-based service that is configured manage and monitor communications between the user 106 (e.g., via the computing device 108) and other users (not shown).

The communication application 110 may be an email application, social networking application, telephonic application, video/voice chat application, text messaging application, instant messaging application, an application that issues push notifications, etc. In some implementations, the communication application 110 is an add-on service to any such applications. In the illustrated implementation, the communication application 110 includes a contacts pane 122 that organizes received messages (e.g., received messages 118 and 120) into tabs which are selectable to display received messages according to the classification of the contacts that sent the received messages 118 and 120. The tabs include a revived tab 112, an important tab 114, and another tab 116, which correspond to a classification of contacts (e.g., a user who sent messages to the user 106). In some implementations, the messages are organized by contact classification by the communication service 102, which forwards the classified messages to the computing device 108 via the communication network 104, and the communication application 110 is configured to organize/display the classified messages according to the classifications designated by the communication service 102. In other implementations, the messages are classified by the communication application 110 itself.

In implementations, the classification of contacts into various classifications illustrated by the tabs 112, 114, and 116 depends on a variety of factors. Such factors may include, without limitation, an amount of interaction with a user, an amount of communications between the user 106 and another user, a designation of significance by the user 106, an organizational association between the user 106 and the classified user, etc. Organizational association refers to a relationship between the user 106 and the contact as defined by an organization such as working for the same employer, being on the same team at a job, having a familial relationship, etc. Once a user is classified as important, a message or communication from such a user is displayed in the important tab 114 or otherwise identified as being from an important contact. In various implementations, a contact, once classified as important, may be declassified as important based on a communication stoppage or decrease in the amount of communication or interaction between the user 106 and the contact.

The implementations described herein provide for the "revived" classification (e.g., the revived tab 112). The revived classification includes messages from contacts that may have been previously classified as important (e.g., the important tab 114), but such contacts have not been communicated with for an extended period of time. As an example, the received message 118 is from "Elvis Presley." The user 106 may have previously been in regular communication with Elvis Presley. Such regular communication may be multiple times a day, every day, every week, a few times every month, etc. Because of such regular communication, Elvis Presley may have been a "significant" contact, and messages from Elvis Presley may have been displayed in the important tab 114. As another example, the user 106 may have designated Elvis Presley as important, and as such, Elvis Presley was a significant contact. However, the user 106 and Elvis Presley have not communicated with each other for an extended period of time. Such a period of time may be, without limitation, three months, six months, one year, more than one year, etc. After the period of time, the user 106 receives a subsequent communication from Elvis Presley. The communication service 102 and/or the communication application 110 detects receipt of the communication, identifies Elvis as being a previously important/significant contact, and designates the message as significant. Thus, the received message 118 is displayed in the special revived tab 112, or the user 106 is otherwise notified of the received message 118 (e.g., by receiving a push notification).

As another example, the received message 120 is from "Thomas Edison," whom the user 106 previously worked with at General Electric. While at General Electric, any messages from Thomas Edison or other employees at General Electric may be displayed in the important tab 114. This is one example of a contact significance due to an "organizational association." However, the user 106 is now working for a new company and has not been in communication with Thomas Edison for an extended period of time. As such, Thomas Edison may not meet a threshold condition as an important contact. After the period of time, Thomas Edison sent the received message 120 to the user 106 to see how the new job of user 106 is going. Because Thomas Edison was considered a significant contact but the user 106 has not been communicated with him for an extended period of time, the newly received message 120 is designated as a significant message and is displayed in the revived tab 112, or the user 106 is otherwise notified of the significant received message 120 (e.g., via a push notification).

To be classified as a communication from a "revived" contact or to be classified as a significant communication condition, a received communication satisfies a significant communication condition. The significant communication condition is dependent on a weighted significance value and a weighted time difference value. The weighted significance value is assigned to a contact based on the level of significance of the contact. The weighted significance value may depend on an amount of interaction with the contact, an amount of communications between the user 106 and the contact, a designation of the significance of the contact by the user 106, an organizational association between the user 106 and the classified contact, etc. As an example, a contact that had regular communication with the user 106 for one year may be attributed a higher weighted significance value than a contact that had periodic communication with the user 106 for six months. The value of the weighted significance value attributed to a contact may be different from user to user and may depend on the number of contacts, the amount of interaction/communication, etc. As such, the weighted significance value may scale depending on a number of factors. To determine the weighted significance value, communications between the user 106 and contacts may be monitored periodically or continually. In other implementations, communications may be analyzed to determine the weighted significance value. In various implementations, the communications may be analyzed after a period of time without communication (e.g., three months) between the user 106 and a contact. Furthermore, the user may designate the contact as a significant contact, providing greater weight to the weighted significance value. In implementations, a maximum weighted significance attributed to the contact may be stored. As such, if the user 106 ceases communication with the contact and the weighted significance value falls below a threshold such as an important threshold condition, the communication service 102 and/or the communication application may use the maximum weighted significance value to determine whether a subsequent communication from the contact meets the significant communication condition. Other methods for determining the weighted significance value may be employed.

The value of the weighted time difference value may depend on a number of factors including a length of a time interval between a last communication between the contact and the subsequently received communication (e.g. received messages 118 and 120). In some implementations, the weighted time difference value is dependent on a time decay function. In such an example implementation, the time decay function may be dependent on the value of the weighted significance value. For example, if a contact is attributed a high weighted significance value, then the weighted time difference value attributed to a message may decrease slow (e.g., as defined by the time decay function) as compared to a contact who has a low weighted significance value, in which the time difference value may decrease faster over the passage of time. For example, contact A has a weighted significance value of 9 (e.g., based on frequent communication) in an example weighted significance value range from 0-10, and contact B has a weighted significance value of 4 (e.g., based on sporadic communication) in the same weighted significance value range from 0-10. After one year without communication (or significantly less communication) between the user 106 and both contact A and contact B. Both contact A and contact B send a message/communication to the user 106. Because contact A had a higher weighted significance value, the time decay function associated with contact A decreases a potential weighted time difference value slower than contact B, which had a lower weighted significance value. Thus, the user 106 may be specifically notified (e.g., the message sent by contact A is designated as significant) of the message sent by A, but the message sent by contact B may not be designated as significant because the message does not satisfy the significant communication condition. In the above-described example, the weighted significance values used may be a maximum weighted significance value achieved, and the time decay function may depend on the maximum weighted significance value achieved by each contact. In various implementations, the time decay function may be a step function. In such an implementation, the weighted time difference value may be the same for ranges between three months and six months, six months and one year, one year and three years, etc.

In some implementations, the time decay function may attach to a contact after a specific communication event between the user 106 and a contact ceases. As such, the time decay may reset/reattach after a subsequent communication if the subsequent communication fails to meet the significant communication condition. In various implementations, the time decay function attaches to a contact after a period (e.g., three months) of no communication between the user 106 and the contact. In some implementations, the time decay function attaches to a user when a user had a weighted significance value attributed (and meets an importance threshold condition) but the weighted significance value also falls below the threshold due to lack of communication. As such, the time decay function attached when the weighted significance value falls below the importance threshold condition. Other methods of initiating the time decay function are contemplated.

In various implementations, the weighted time difference value increases as time passes between the last communication between the user 106 and the contact. For example, a communication after three months of no communication between the user 106 and the contact may not meet the significant communication condition and thus may not be designated as a significant communication. However, if the contact sends the same subsequent communication to the user 106 after one year instead of three months, then the communication may meet the significant communication condition and be designated as a significant communication. Thus, the time difference value may be an inverse time decay function or a step function (e.g., step up).

In various implementations, the weighted significance value and the weighted time difference value are summed to determine whether a communication meets the significant communication condition. In such an implementation, the significant communication condition is a threshold. In some implementations, the threshold moves or scales depending on a number of factors including, the time of last communication, the number of contacts associated with a user, etc. In implementations that use the maximum weighted significance value, the maximum weighted significance value may be summed with the weighted time difference value to determine whether the condition is satisfied.

To keep track of various contacts associated with the user 106, the communications service 102 and/or the communication application 110 may store and document a knowledge graph. Such a knowledge graph may be a star graph. For example, the user 106 is the center of the star graph and attached nodes are contacts. The edge between the user 106 and the contact may be representative of the weighted significance value and weighted time difference value.

In the illustrated implementation, the communications are the received messages 118 and 120. However, it should be understood that a communication may include any type of communication such as a "like," comment, email, phone call, social media message, video call, group message, etc. Furthermore, multiple communication channels may be monitored. For example, the last communication between the user 106 and a contact may be via email. The subsequent communication may be a social media message. The implementations described herein are configured to monitor communications over various communication channels to determine the significance of the contact and any subsequent communications. In some implementations, push notifications received by either party are monitored to determine the significance of the contact.

In the illustrated implementation, the "revived" designation is used for illustrative purposes, but it should be understood that such messages may be otherwise designated as being from a "lost" contact. Furthermore, such a designation may be indicated using other techniques. In some implementations, the user 106 is notified of a message deemed significant based on the described implementations by sending a push notification to the user on the computing device 108. Other notification/designation mechanisms may be employed.

Figure 2:
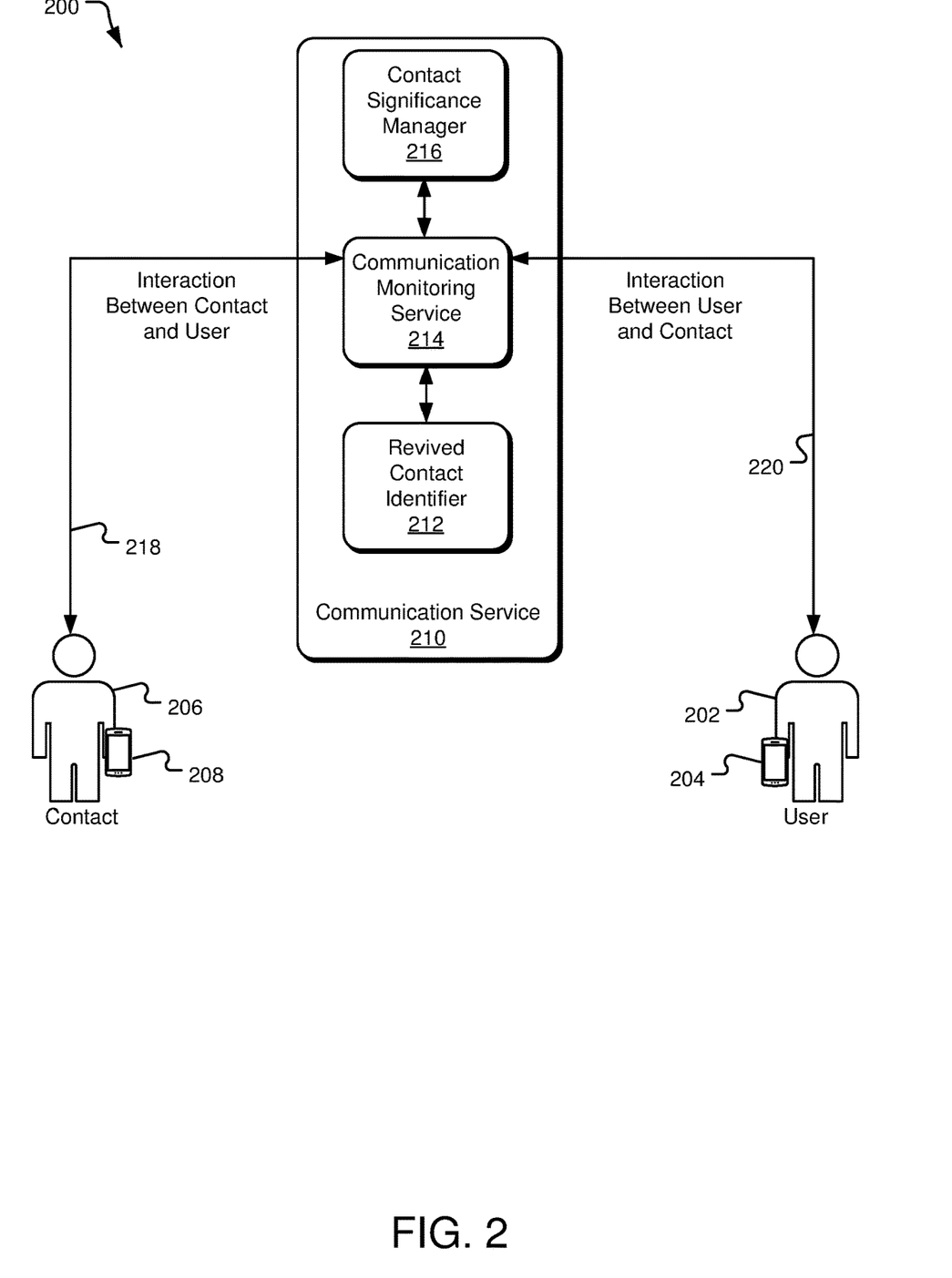
FIG. 2 illustrates an example block diagram for identifying a significant communication from a revived contact.

FIG. 2 illustrates another example block diagram 200 for identifying a significant communication from a revived contact. Specifically, FIG. 2 illustrates data flow for identifying a significant contact. The block diagram 200 includes a communication service 210, a user 202 with a computing device 204, and a contact 206 with a computing device 208. The communication service 210 may be a cloud-based communication service or a communication service application on the device 204 of the user 202 or a combination of a cloud-based and device based service. The communication service includes a revived contact identifier 212, a communication monitoring service 214, and a contact significance manager 216. The revived contact identifier 212, the communication monitoring service 214, and the contact significance manager 216 are illustrated as being separate modules of the communication service 210, but it should be understood that the revived contact identifier 212, the communication monitoring service 214, and the contact significance manager 216 may be combined.

The communication monitoring service 214 monitors interaction between the contact 206 and the user 202 (interaction illustrated by arrows 218 and 220). The interaction may be emails between the user 202 and the contact 206, social media messages, "likes," push notifications, etc. The interaction may further include a designation of the contact 206 by the user 202 as an important or significant contact. The interaction further includes any organizational associations including familial associations, employment associations, etc. The communication monitoring service 214 collects the data of such interaction, and the contact significance manager 216 uses the collected interaction data to determine the weighted significance value to assigned to the contact 206. The contact significance manager 216 may use such data as the frequency of interaction, the response time, the number of communications, the location, the significance designation by the user 202, the number of common contacts between the user 202 and the contact 206, etc. to determine the weighted significance value to attribute to the contact 206. The weighted significance value assigned to the contact 206 may be intermittently adjusted based on communications. As such, when communications between the contact 206 and the user 202 start to slow down, the weighted significance value may fall below an "importance threshold" where communications may not be prioritized for the user 202. In some implementations, the communication service 210 stores the maximum weighted significance value achieved.

When the contact 206 and the user 202 cease communications for an extended period of time (e.g., three months) or when the weighted significance value falls below the importance threshold, the communication monitoring service monitors for subsequent communication by the contact 206 to the user 202. If the communication monitoring service detects subsequent communication, the revived contact identifier 212 determines a weighted time difference value based on time since last communication and possibly uses the weighted significance value (or the maximum weighted significance value) determined by the contact significance manager 216 to determine the weighted time difference value. Furthermore, the revived contact identifier 212 determines whether the subsequent communication satisfies a significant communication condition based on the weighted time difference value and the weighted significance value.

Figure 3:
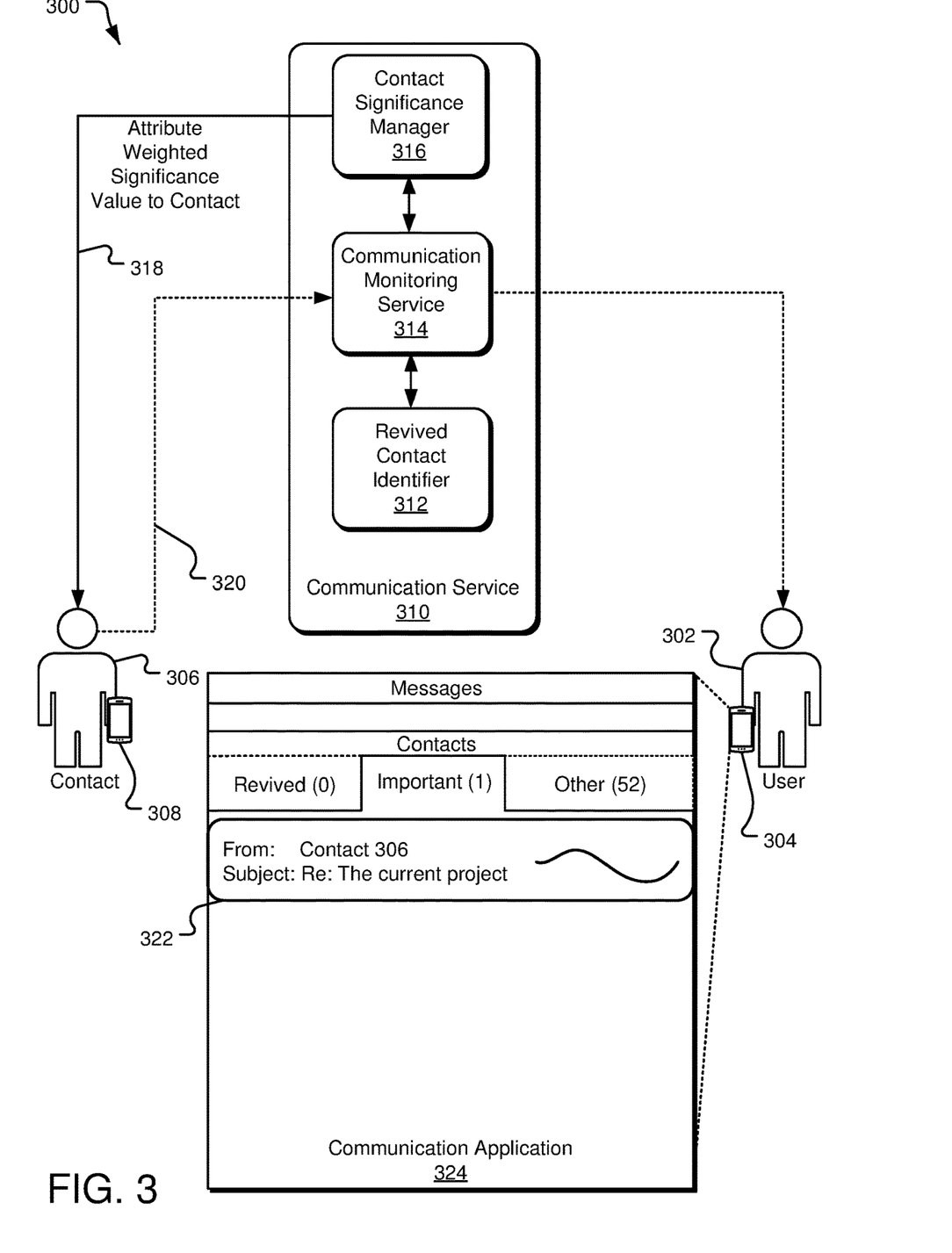
FIG. 3 illustrates an example block diagram for identifying a significant communication from a revived contact.

FIG. 3 illustrates another example block diagram 300 for identifying a significant communication from a revived contact. Specifically, FIG. 3 illustrates data flow for attributing a weighted significance value to a contact 306. The block diagram 300 includes a communication service 310, a user 302 with a computing device 304, and a contact 306 with a computing device 308. The communication service 310 may be a cloud-based communication service or a communication service application on the device 304 of the user 302 or a combination of a cloud-based and device based service. The communication service includes a revived contact identifier 312, a communication monitoring service 314, and a contact significance manager 316. The revived contact identifier 312, the communication monitoring service 314, and the contact significance manager 316 are illustrated as being separate modules of the communication service 310, but it should be understood that the revived contact identifier 312, the communication monitoring service 314, and the contact significance manager 316 may be combined.

In FIG. 3, the communication monitoring service 314 has monitored interaction between the user 302 and the contact 306 and collected data on such interaction. The contact significance manager 316 attributes a weighted significance value to the contact (illustrated by an arrow 318). Such attribution may take place in the cloud or on the device 304 of the user 302. The communication service 310 may use the weighted significance value attributed to the contact 306 to identify any communication (e.g., a communication illustrated by arrow 320) during standard communication intervals as an important communication (e.g., an important message 322 displayed in a communication application 324). The contact significance manager 316 may continually update the weighted significance value based on interaction. The contact significance manager 316 may further store a maximum weighted significance value achieved.

After an extended time interval between communication between the user 302 and the contact 306 (or when the weighted significance value falls below an importance threshold due to lack of communication), the communication monitoring service 314 may monitor for or detect a subsequent communication that may be designated as significant by the revived contact identifier 312. If the communication monitoring service detects subsequent communication, the revived contact identifier 312 determines a weighted time difference value based on time since last communication and possibly uses the weighted significance value (or maximum weighted significance value) determined by the contact significance manager 316 to determine the weighted time difference value. Furthermore, the revived contact identifier 312 determines whether the subsequent communication satisfies a significant communication condition based on the weighted time difference value and the weighted significance value.

Figure 4:
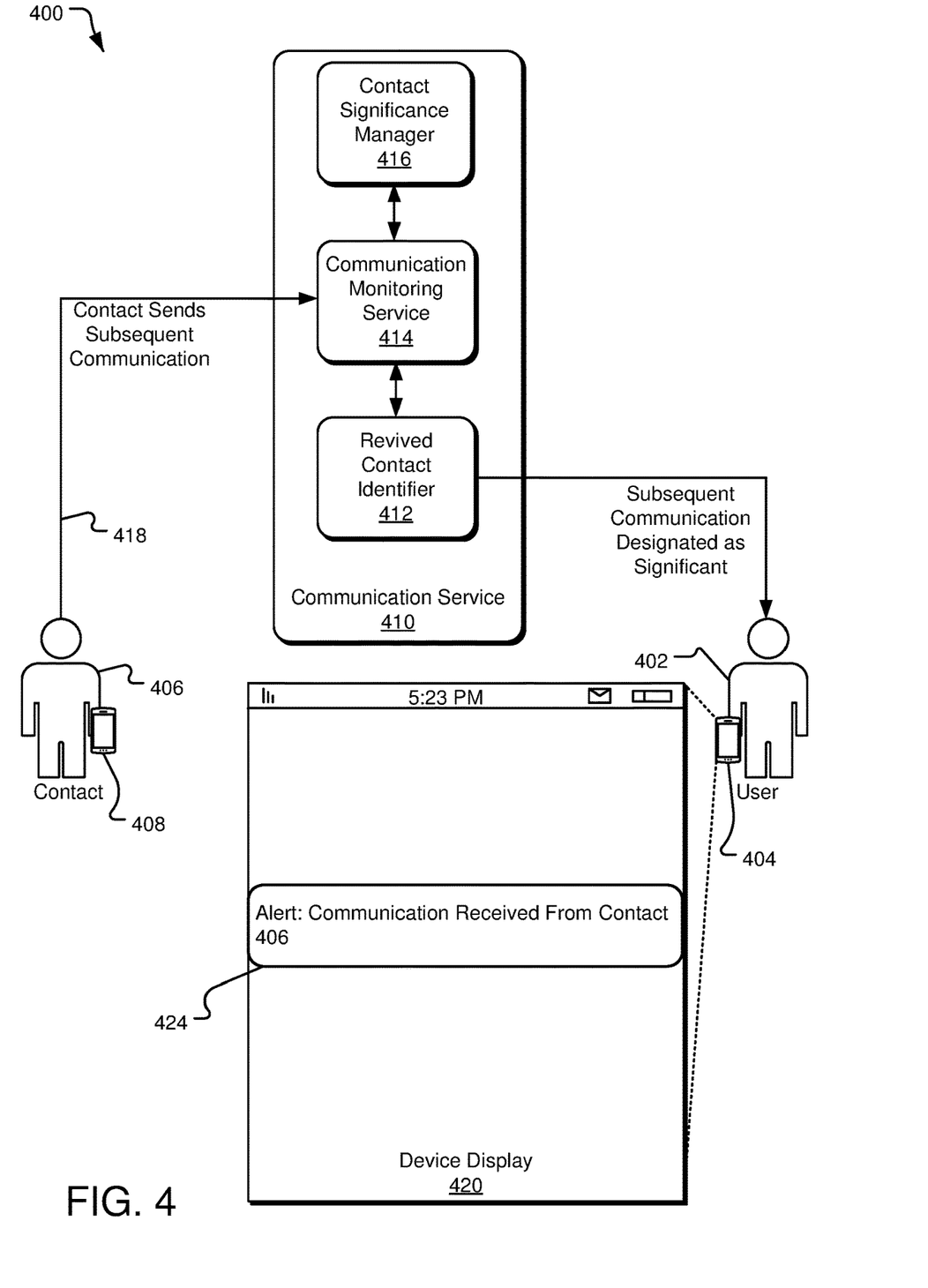
FIG. 4 illustrates an example block diagram for identifying a significant communication from a revived contact

FIG. 4 illustrates another example block diagram 400 for identifying a significant communication from a revived contact. Specifically, FIG. 4 illustrates data flow for attributing a weighted significance value to a contact 406. The block diagram 400 includes a communication service 410, a user 402 with a computing device 404, and a contact 406 with a computing device 408. The communication service 410 may be a cloud-based communication service or a communication service application on the device 404 of the user 402 or a combination of a cloud-based and device based service. The communication service includes a revived contact identifier 412, a communication monitoring service 414, and a contact significance manager 416. The revived contact identifier 412, the communication monitoring service 414, and the contact significance manager 416 are illustrated as being separate modules of the communication service 410, but it should be understood that the revived contact identifier 412, the communication monitoring service 414, and the contact significance manager 416 may be combined.

In FIG. 4, the contact 406 has been attributed a weighted significance value by the contact significance manager 416 based on the previous interaction between the contact 406 and the user 402. Furthermore, there has been a lapse in communication between the contact 406 and the user 402. Such a lapse may include a time interval for about three months for example. Because of the lapse (and possibly because the weighted significance value falls below an importance threshold), the communication monitoring service 414 monitors for subsequent communications from the contact 406 or detects any subsequent communication. The contact 406 sends a subsequent communication (illustrated by an arrow 418) to the user 402, the communication monitoring service 414 detects the subsequent communication. The revived contact identifier 412 determines a time since last communication (e.g., three months) and uses the determined time to determine a weighted time difference value. The weighted time difference value may further be dependent on the weighted significance value attributed to the contact 406 by the contact significance manager 416 (or a maximum weighted significance value achieved by the contact 406 and stored by the contact significance manager 416). After determining the weighted time difference value, the revived contact identifier determines whether the subsequent communication satisfies a significant communication condition using the weighted significance value and the weighted time difference value.

If the subsequent communication satisfies the significant communication condition, the revived contact identifier designates the subsequent communication as a significant communication condition. Because the subsequent communication is designated as a significant communication, a device 404 of the user may display the subsequent communication or an alert (e.g., an alert 424, which may be a push notification) on a device display 420 of the device 404 such as to alert the user 402 of the communication from a "revived" contact. If the subsequent communication does not satisfy the significant communication condition, then the communication may be processed in by the device 404 or a communication application executing on the device.

Figure 5:
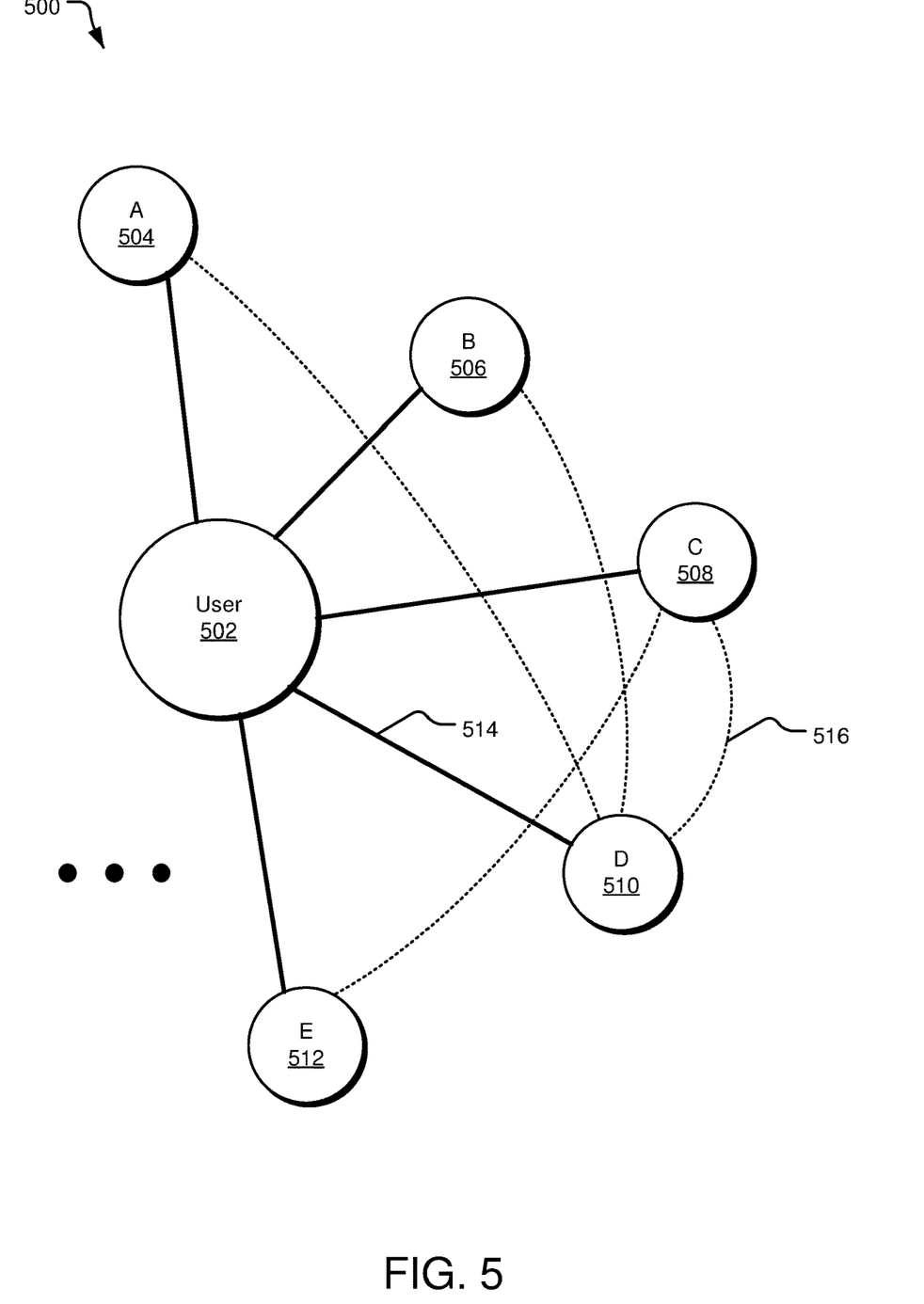
FIG. 5 illustrates an example knowledge graph that may be useful in implementing the described technology.

FIG. 5 illustrates an example knowledge graph 500 that may be useful in implementing the described technology. The knowledge graph includes a user node 502 and a number of contact nodes (e.g., a contact node A 504, a contact node B 506, a contact node C 508, a contact node D 510, and a contact node E 512). Each of the contact nodes represents a contact that the user communicates with or has communicated with in the past. Each edge (e.g., an edge 514) of the knowledge graph 500 represents a combination of a weighted significance assigned to the contact represented by a node and a weighted time difference value assigned to the contact represented by the node (and based at least on the period of time since last communication).

If a contact node, such as the contact node B 506, represents a contact with a relatively high weighted significance value, then an edge between the contact node B 506 and the user node 502 is shorter. In implementations, the user may stop communicating with contact B, and thus the contact node B 506 extends further away from the user node 502 (because of the weighted significance value decrease). However, if the weighted significance value drops below a threshold, a time decay function may attach to node B. The time decay function may depend on a maximum weighted significance value achieved by contact B. As time progresses, B may begin to drift closer (due to the time decay function increasing a weighted time difference value represented by the edge between the contact node B 506 and the user node 502). When a subsequent message is received by contact B, the edge between the contact node B 506 and the user node 502 may be used to determine whether a significance communication condition is satisfied.

In some implementations, a contact relationship may be used to determine a weighted significance value. For example, if a user contact regularly communicates with other contacts with the user, then such a contact may be given a higher weighted significance value. In the illustrated implementation, contact edges (e.g., a contact edge 516) illustrates a relationship between contacts. Such a relationship may be defined by regular communication, working in the same department at a company, a familial relationship (referred to as an organizational association), etc. Furthermore, the implementations described herein may be used to define such a relationship. For example, if the contact node A 504 is considered a user, the communication system may consider the contact node D 510 as a related contact because the contact node D 510 has a weighted significance value over an importance threshold from the perspective of the contact node A 504. The contact node A 504 has a single contact relationship with the contact node D 510. However, the contact node D 510 has three relationships with other defined nodes (the contact node A 504, the contact node B 506, and the contact node C 508). As such, the contact node D 510 may be given a higher weighted significance value for the user (e.g., the user node 502) than the contact node A 504.

Figure 6:
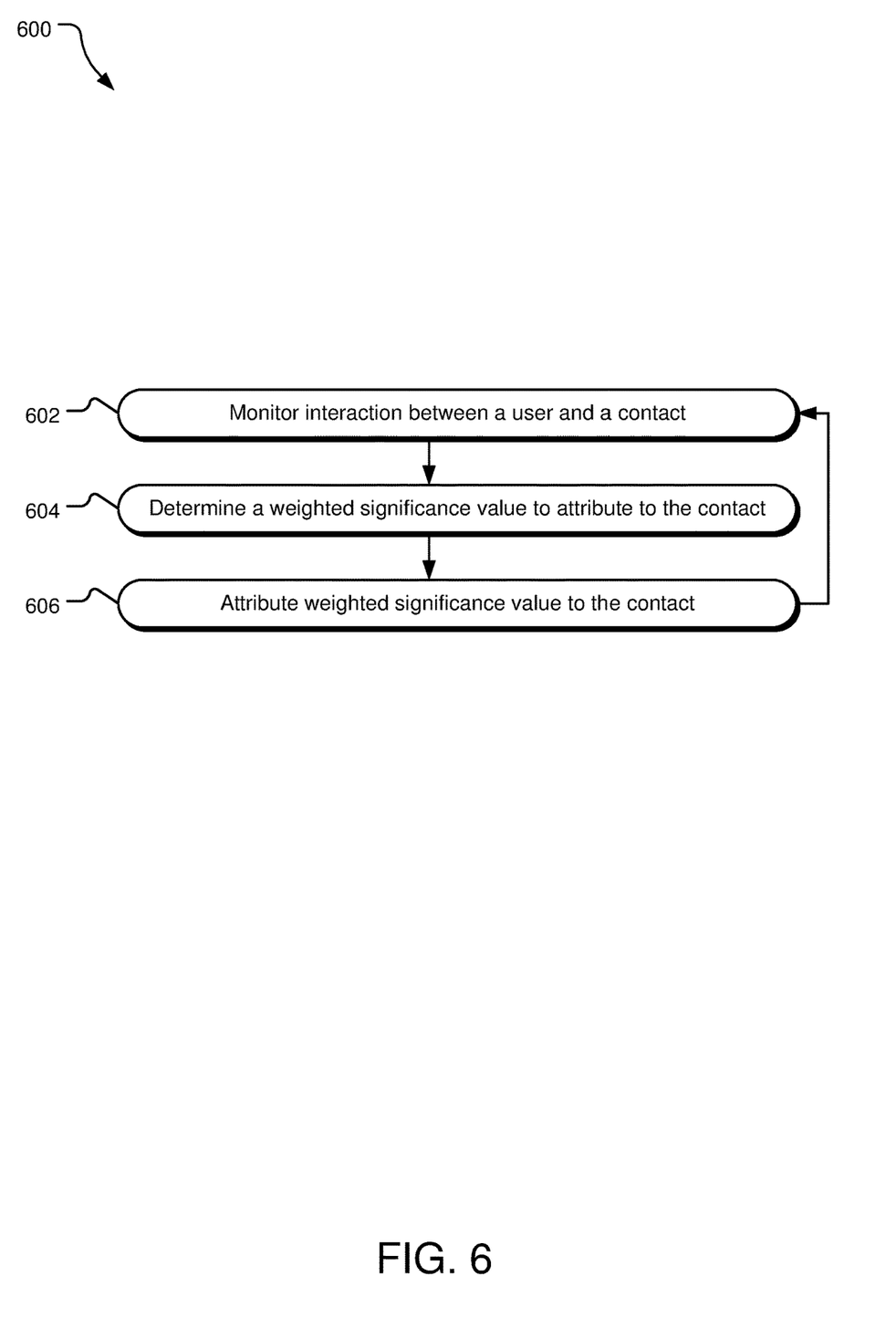
FIG. 6 illustrates example operations for determining a weighted significance value for a contact.

FIG. 6 illustrates example operations 600 for determining a weighted significance value for a contact. A monitoring operation 602 monitors interaction between a user and a contact. The monitoring operation 602 may monitor communications between the user and the contact. The monitoring operation 602 may detect a designation of significance by the user of the contact. The monitoring operation 602 may monitor interaction between different contacts of the user such as to establish relationships between contacts of the user (e.g., to establish organizational associations). The monitoring operation is performed by a communication monitoring service. In various implementations, a data store of communications may be analyzed to determine the weighted significance value. A determining operation 604 determines a weighted significance value to attribute to the contact. The weighted significance value may depend on the amount of interaction, the frequency of communication, the response time, etc. The determining operation 604 may be determined by a contact significance manager. An attributing operation 606 attributes the weighted significance value to the contact. The operations 600 may be continuously or intermittently repeated, and as such, the weighted significance value is updated.

Figure 7:
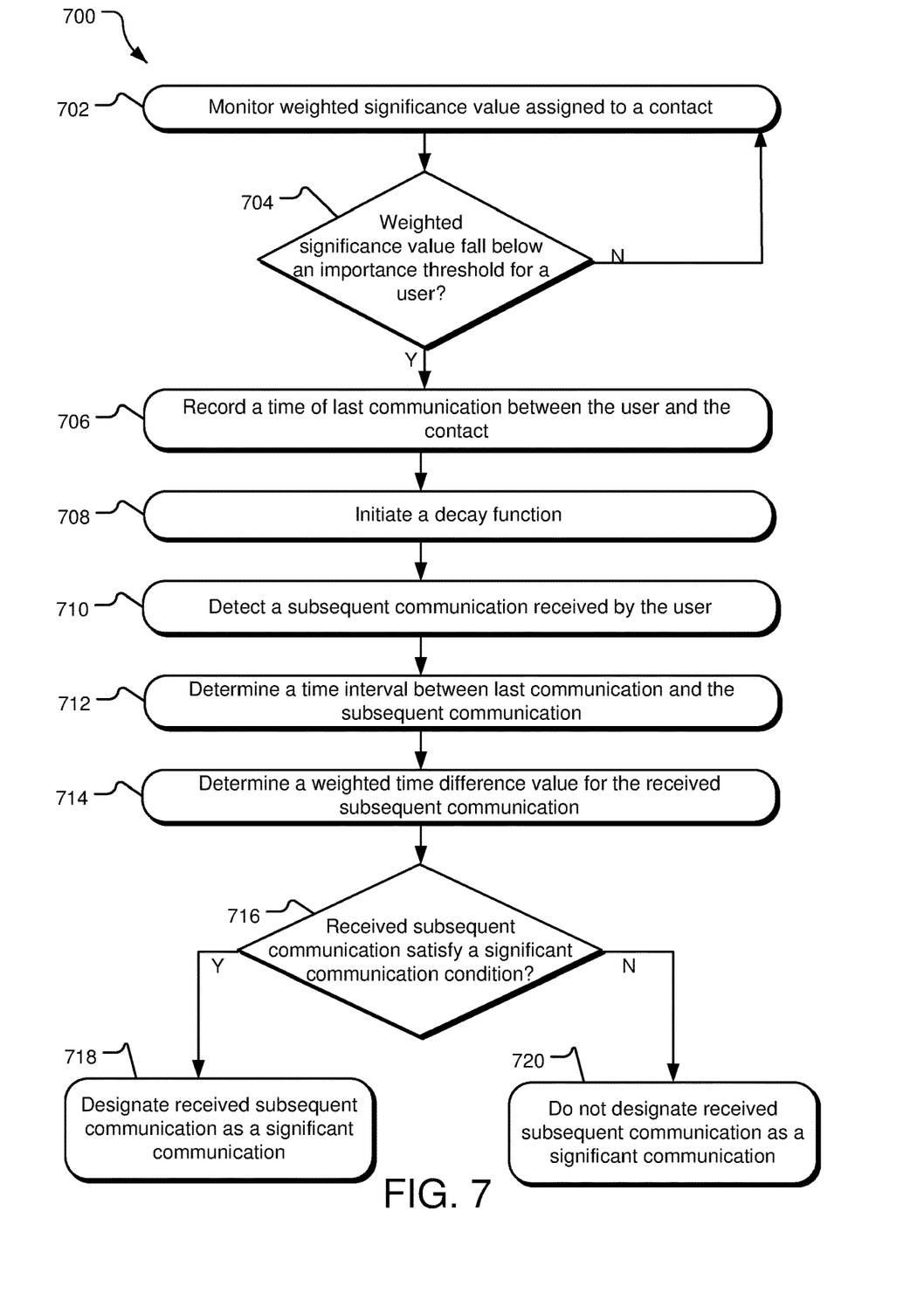
FIG. 7 illustrates example operations for determining whether a subsequent communication is designated as a significant communication

FIG. 7 illustrates example operations 700 for determining whether a subsequent communication is designated as a significant communication. A monitoring operation 702 monitors the weighted significance value assigned to a contact. A determining operation 704 determines whether the weighted significance value falls below an important threshold for a user. The importance threshold may depend on the particular user. For example, a user that communicates with high number of contacts may have a higher importance threshold than a user that communicates with a lower number of contacts. If the weighted significance value does not fall below the importance threshold, then the process returns to the monitoring operation 702. If the weighted significance value falls below the importance threshold, a recording operation 706 records a time of last communication between the user and the contact. An initiating operation 708 initiates a decay function. The decay function may be dependent on the maximum weighted significance value achieved. Thus, the maximum weighted significance value may be stored in a storing operation (not shown) in some implementations. Receipt of a subsequent communication is monitored responsive to determining that the weighted significance value falls below the importance threshold condition.

A detecting operation 710 detects a subsequent communication received by the user. The detection operation 710 may occur after an extended period of time after the weighted significance value falls below the importance threshold. A time of receipt of the subsequent communication may be recorded A determining operation 712 determines a time interval between the time of last communication and the subsequent communication. A determining operation 714 determines a weighted time difference value for the received subsequent communication. The weighted time difference value may be determined based on a time interval between the time of receipt of the subsequent communication and the time of the last communication. A determining operation 716 determines whether the received subsequent communication satisfies a significant communication condition. Such a determination may be based on the weighted significance value and the weighted time difference value. If the received subsequent communication satisfies the significant communication condition, a designating operation 718 designates the received subsequent communication as a significant communication. As such, a device of the user may notify the user of the significant communication, the significant communication may be displayed in a "revived" contact pane, or the user is otherwise notified of the significant communication. If the received subsequent communication does not satisfy the significant communication condition, then a designating operation 720 does not designate the received subsequent communication as a significant communication.

Figure 8:
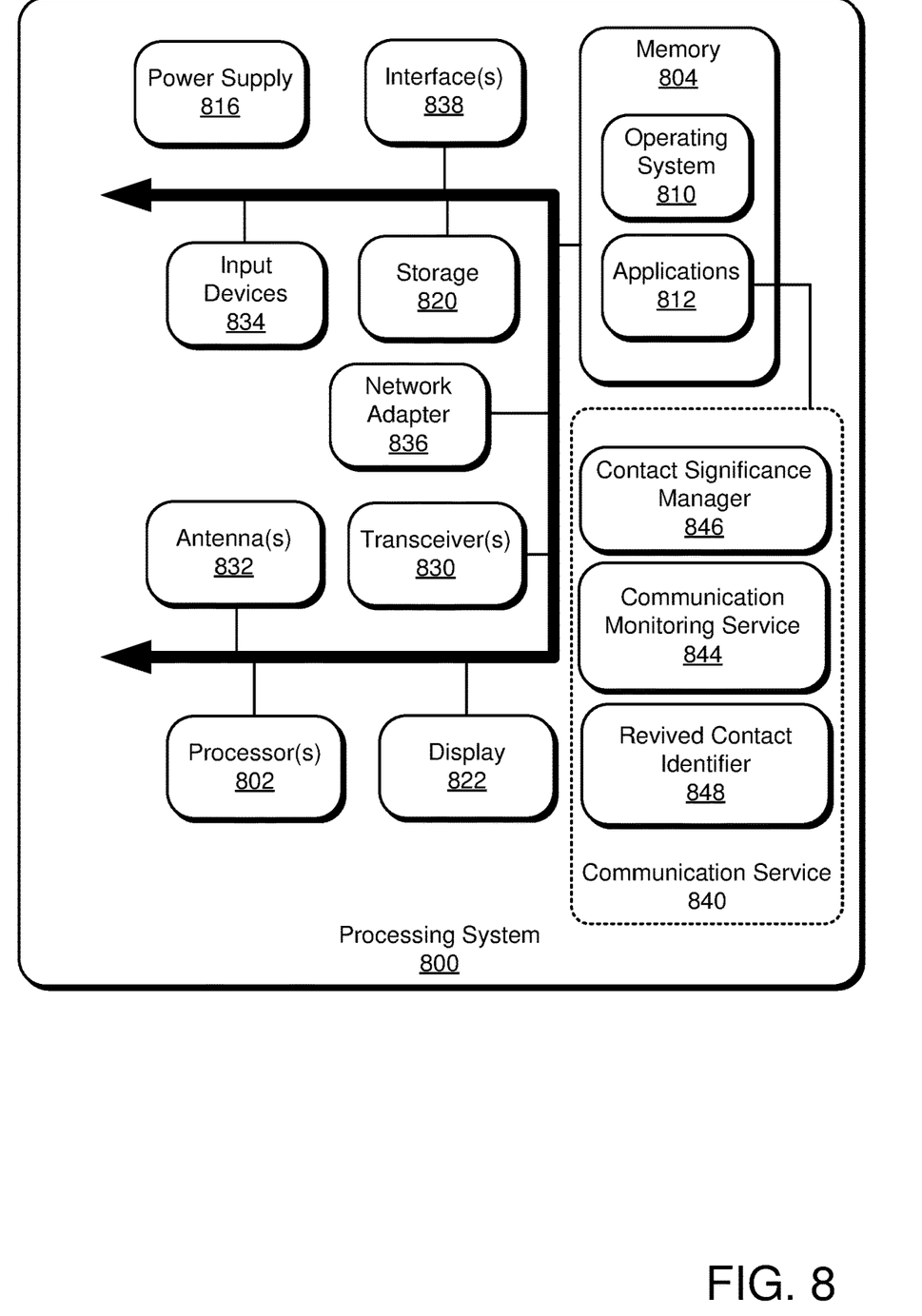
FIG. 8 illustrates an example system that may be useful in implementing the described technology.

FIG. 8 illustrates an example system (labeled as a processing system 800) that may be useful in implementing the described technology. The processing system may be a client device such as a laptop, mobile device, desktop, tablet, or a server/cloud device. The processing system 800 includes one or more processor(s) 802, and a memory 804. The memory 804 generally includes both volatile memory (e.g., RAM) and non-volatile memory (e.g., flash memory). An operating system 810 resides in the memory 804 and is executed by the processor(s) 802.

One or more application programs 812 modules or segments, such as a communication service 840 are loaded into the memory 804 and/or storage 820 and executed by the processor(s) 802. The application programs 812 or modules may include the communication service 840 implemented by a contact significance manager 846, communication monitoring service 844, revived contact identifier service 848, etc. which may be embodied in instructions stored in the memory 804 and/or storage 820 and executed by the processor(s) 802. Data such as significant communication conditions, contact information, communications, designations, interactions, communication times, weighted significance values attributed to contacts, time decay function values, weighted time difference values, etc. may be stored in the memory 804 or storage 820 and may be retrievable by the processor(s) 802 for use in the by the communication service 840, the contact significance manager 846, the communication monitoring service 844, the revived contact identifier service 848, etc. The storage 820 may be local to the processing system 800 or may be remote and communicatively connected to the processing system 800 and may include another server. The storage 820 may store resources that are requestable by client devices (not shown).

The processing system 800 includes a power supply 816, which is powered by one or more batteries or other power sources and which provides power to other components of the processing system 800. The power supply 816 may also be connected to an external power source that overrides or recharges the built-in batteries or other power sources.

The processing system 800 may include one or more communication transceivers 830 which may be connected to one or more antenna(s) 832 to provide network connectivity (e.g., mobile phone network, Wi-Fi®, Bluetooth®, etc.) to one or more other servers and/or client devices (e.g., mobile devices, desktop computers, or laptop computers). The processing system 800 may further include a network adapter 836, which is a type of communication device. The processing system 800 may use the adapter and any other types of communication devices for establishing connections over a wide-area network (WAN) or local-area network (LAN). It should be appreciated that the network connections shown are exemplary and that other communications devices and means for establishing a communications link between the processing system 800 and other devices may be used.

The processing system 800 may include one or more input devices 834 such that a user may enter commands and information (e.g., a keyboard or mouse). These and other input devices may be coupled to the server by one or more interfaces 838 such as a serial port interface, parallel port, universal serial bus (USB), etc. The processing system 800 may further include a display 822 such as a touch screen display.

The processing system 800 may include a variety of tangible processor-readable storage media and intangible processor-readable communication signals. Tangible processor-readable storage can be embodied by any available media that can be accessed by the processing system 800 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing system 800. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

An example system includes a contact significance manager that attributes a weighted significance value to a contact. The weighted significance value is determined based on interaction between the contact and a user. The example system further includes a communication monitoring service configured to detect a subsequent communication received by the user from the contact. The example system further includes a revived contact identifier configured to determine a weighted time difference value for the received subsequent communication. The weighted time difference value is based on a time interval between a time of a last communication between the contact and the user and a time of receipt of the subsequent communication by the user. The revived contact identifier is further configured to designate the received subsequent communication as a significant communication responsive to a determination that the subsequent communication satisfies a significant communication condition. Satisfaction of the significant communication condition is dependent on the weighted significance value and the weighted time difference value.

An example system of any preceding system includes the revived contact identifier determining the weighted time difference value based on a time decay function, the time decay function dependent on the weighted significance value attributed to the contact.

An example system of any preceding system includes the contact significance manager determining the weighted significance value based on an analysis of communications between the contact and the user.

An example system of any preceding system includes the contact significance manager determining the weighted significance value based on a designation of significance of the user by the contact.

An example system of any preceding system includes the contact significance manager determining the weighted significance value based on an organizational association between the contact and the user.

An example system of any preceding system includes the contact significance manager storing a maximum weighted significance value attributed to the contact based on the interaction between the contact and the user. The revived contact identifier determines the weighted time difference value based on a time decay function dependent on the maximum weighted significance value. The time decay function is initiated when the weighted significance value falls below an importance threshold.

An example system of any preceding system includes the weighted significance value and the weighted time difference value being represented by an edge of a knowledge graph, the knowledge graph including a user node for the user and at least one contact node for the contact.

An example method includes attributing a weighted significance value to a contact, the weighted significance value determined based on interaction between the contact and a user, detecting a subsequent communication received by the user from the contact, determining a weighted time difference value for the received subsequent communication, the weighted time difference value being based on a time interval between a time of a last communication between the contact and the user and a time of receipt of the subsequent communication by the user, and designating the received subsequent communication as a significant communication responsive to determining that the subsequent communication satisfies a significant communication condition, satisfaction of the significant communication condition being dependent on the weighted significance value and the weighted time difference value.

An example method of any preceding method includes the weighted time difference value is determined using a time decay function, the time decay function dependent on the weighted significance value attributed to the contact.

An example method of any preceding method includes the weighted significance value being determined based on an analysis of communications between the contact and the user.

An example method of any preceding method includes the weighted significance value being determined responsive to a designation of significance of the contact by the user.

An example method of any preceding method includes the weighted significance value being determined based on an organizational association between the contact and the user.

An example method of any preceding method includes storing a maximum weighted significance value attributed to the contact based on the interaction between the user and the contact, determining that the weighted significance value meets a threshold condition, and monitoring receipt of the subsequent communication from the contact responsive to attributing the weighted significance value to the contact.

An example method of any preceding method includes the weighted significance value and the weighted time difference value being represented by an edge of a knowledge graph, the knowledge graph including a user node for the user and at least one contact node for the contact.

An example system includes means for attributing a weighted significance value to a contact, the weighted significance value determined based on interaction between the contact and a user, detecting a subsequent communication received by the user from the contact, determining a weighted time difference value for the received subsequent communication, the weighted time difference value being based on a time interval between a time of a last communication between the contact and the user and a time of receipt of the subsequent communication by the user, and designating the received subsequent communication as a significant communication responsive to determining that the subsequent communication satisfies a significant communication condition, satisfaction of the significant communication condition being dependent on the weighted significance value and the weighted time difference value.

An example system of any preceding system includes means for the weighted time difference value is determined using a time decay function, the time decay function dependent on the weighted significance value attributed to the contact.

An example system of any preceding system includes means for the weighted significance value being determined based on an analysis of communications between the contact and the user.

An example system of any preceding system includes means for the weighted significance value being determined responsive to a designation of significance of the contact by the user.

An example system of any preceding system includes means for the weighted significance value being determined based on an organizational association between the contact and the user.

An example system of any preceding system includes means for storing a maximum weighted significance value attributed to the contact based on the interaction between the user and the contact, determining that the weighted significance value meets a threshold condition, and monitoring receipt of the subsequent communication from the contact responsive to attributing the weighted significance value to the contact.

An example system of any preceding system includes means for the weighted significance value and the weighted time difference value being represented by an edge of a knowledge graph, the knowledge graph including a user node for the user and at least one contact node for the contact.

Example one or more tangible processor-readable storage media embodied with instructions for executing on one or more processors and circuits of a device a process includes attributing a weighted significance value to a contact, the weighted significance value determined based on interaction between the contact and a user, detecting a subsequent communication received by the user from the contact, determining a weighted time difference value for the received subsequent communication, the weighted time difference value based on a time interval between a time of a last communication between the contact and the user and a time of receipt of the subsequent communication by the user, and designating the received subsequent communication as a significant communication responsive to determining that the subsequent communication satisfies a significant communication condition, satisfaction of the significant communication condition being dependent on the weighted significance value and the weighted time difference value.

Another example one or more tangible processor-readable storage media embodied with instructions for executing on one or more processors and circuits of a device a process of any preceding process includes the weighted time difference value being determined using a time decay function, the time decay function dependent on the weighted significance value attributed to the contact.

Another example one or more tangible processor-readable storage media embodied with instructions for executing on one or more processors and circuits of a device a process of any preceding process includes the weighted significance value being determined based on an analysis of communications between the contact and the user.

Another example one or more tangible processor-readable storage media embodied with instructions for executing on one or more processors and circuits of a device a process of any preceding process includes the weighted significance value being determined responsive to a designation of significance of the contact by the user.

Another example one or more tangible processor-readable storage media embodied with instructions for executing on one or more processors and circuits of a device a process of any preceding process includes the weighted significance value being determined based on an organizational association between the contact and the user.

Another example one or more tangible processor-readable storage media embodied with instructions for executing on one or more processors and circuits of a device a process of any preceding process includes storing a maximum weighted significance value attributed to the contact based on the interaction between the user and the contact, determining that the weighted significance value meets a threshold condition, and monitoring receipt of the subsequent communication from the contact responsive to attributing the weighted significance value to the contact.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A system comprising:
    a contact significance manager that attributes a weighted significance value to a contact, the weighted significance value determined based on detected interaction between the contact and a user;
    a communication monitoring service configured to detect a last communication received by the user from the contact and a subsequent communication received by the user from the contact after the last communication; and
    a revived contact identifier configured to:
        determine a weighted time difference value for the received subsequent communication, the weighted time difference value being based on a time interval between a time of the last communication received by the user from the contact and a time of receipt of the subsequent communication received by the user from the contact, the weighted time difference value higher when the time interval is longer, and
        designate the received subsequent communication as a significant communication responsive to a determination that the subsequent communication satisfies a significant communication condition, satisfaction of the significant communication condition being dependent on the weighted significance value and the weighted time difference value.

2. The system of claim 1 wherein the revived contact identifier determines the weighted time difference value based on a time decay function, the time decay function dependent on the weighted significance value attributed to the contact.

3. The system of claim 1 wherein the contact significance manager determines the weighted significance value based on an analysis of the communications received by the user from the contact.

4. The system of claim 1 wherein the contact significance manager determines the weighted significance value taking into account a designation of significance of the user by the contact.

5. The system of claim 1 wherein the contact significance manager determines the weighted significance value taking into account an organizational association between the contact and the user.

6. The system of claim 1 wherein the contact significance manager stores a maximum weighted significance value attributed to the contact based on the interaction between the contact and the user, the revived contact identifier determines the weighted time difference value based on a time decay function dependent on the maximum weighted significance value, the time decay function initiated when the weighted significance value falls below an importance threshold.

7. The system of claim 1 wherein the weighted significance value and the weighted time difference value are represented by an edge of a knowledge graph, the knowledge graph including a user node for the user and at least one contact node for the contact.

8. The system of claim 1, wherein the communication monitoring service is further configured to monitor the detected interaction between the contact and the user.

9. The system of claim 8, wherein the weighted significant value is based on an amount of the detected interaction monitored by the communication monitoring service.

10. The system of claim 8, wherein the weighted significant value is based on a frequency of the detected interaction monitored by the communication monitoring service.

11. The system of claim 8, wherein the weighted significant value is based on a relationship between the user and the contact monitored by the communication monitoring service.

12. The system of claim 8, wherein the weighted significant value is based on an organizational association between the user and the contact monitored by the communication monitoring service.

13. The system of claim 1, wherein the weighted significance value is higher when the detected interaction between the contact and the user is higher.

14. A method comprising:
attributing a weighted significance value to a contact, the weighted significance value determined based on detected interaction between the contact and a user;
detecting a last communication received by the user from the contact;
detecting a subsequent communication, subsequent to the last communication, the subsequent communication received by the user from the contact;
determining a weighted time difference value for the received subsequent communication, the weighted time difference value being based on a time interval between a time of the last communication and a time of receipt of the subsequent communication by the user, the weighted time difference value higher when the time interval is longer; and
designating the received subsequent communication as a significant communication responsive to determining that the subsequent communication satisfies a significant communication condition, satisfaction of the significant communication condition being dependent on the weighted significance value and the weighted time difference value.

15. The method of claim 14 wherein the weighted time difference value is determined using a time decay function, the time decay function dependent on the weighted significance value attributed to the contact.

16. The method of claim 14 wherein the weighted significance value is determined based on an analysis of the communications received by the user from the contact.

17. The method of claim 14 wherein the weighted significance value is determined taking into account a designation of significance of the contact by the user.

18. The method of claim 14 wherein the weighted significance value is determined taking into account an organizational association between the contact and the user.

19. The method of claim 14 further comprising:
storing a maximum weighted significance value attributed to the contact based on the interaction between the user and the contact;
determining that the weighted significance value meets a threshold condition; and
monitoring receipt of the subsequent communication by the user from the contact responsive to attributing the weighted significance value to the contact.

20. The method of claim 14 wherein the weighted significance value and the weighted time difference value are represented by an edge of a knowledge graph, the knowledge graph including a user node for the user and at least one contact node for the contact.

21. One or more tangible processor-readable storage media embodied with instructions for executing on one or more processors and circuits of a device a process comprising:
attributing a weighted significance value to a contact, the weighted significance value determined based on detected interaction between the contact and a user;
detecting a last communication received by the user from the contact;
detecting a subsequent communication, subsequent to the last communication, the subsequent communication received by the user from the contact;
determining a weighted time difference value for the received subsequent communication, the weighted time difference value being based on a time interval between a time of the last communication and a time of receipt of the subsequent communication by the user, the weighted time difference value higher when the time interval is longer; and
designating the received subsequent communication as a significant communication responsive to determining that the subsequent communication satisfies a significant communication condition, satisfaction of the significant communication condition being dependent on the weighted significance value and the weighted time difference value.

22. The one or more tangible processor-readable storage media of claim 21 wherein the weighted time difference value is determined using a time decay function, the time decay function dependent on the weighted significance value attributed to the contact.

23. The one or more tangible processor-readable storage media of claim 21 wherein the weighted significance value is determined based on an analysis of the communications received by the user from the contact.

24. The one or more tangible processor-readable storage media of claim 21 wherein the weighted significance value is determined responsive to a designation of significance of the contact by the user.

25. The one or more tangible processor-readable storage media of claim 21 wherein the weighted significance value is determined based on an organizational association between the contact and the user.

26. The one or more tangible processor-readable storage media of claim 21 wherein the process further comprises:
storing a maximum weighted significance value attributed to the contact based on the interaction between the user and the contact;
determining that the weighted significance value meets a threshold condition; and
monitoring receipt of the subsequent communication from the contact responsive to attributing the weighted significance value to the contact.

* * * * *